US012812745B2

United States Patent
Herrera et al.

(10) Patent No.: US 12,812,745 B2
(45) Date of Patent: Nov. 24, 2026

(54) SEMI-SIMULTANEOUS DRIVING FOR MULTIJUNCTION POLYCHROMIC DEVICES

(71) Applicant: Lumileds LLC, San Jose, CA (US)

(72) Inventors: Daniel Herrera, Santa Clara, CA (US); Ronald Johannes Bonne, Plainfield, IL (US)

(73) Assignee: Lumileds LLC, San Jose, CA (US)

( * ) Notice: Subject to any disclaimer, the term of this patent is extended or adjusted under 35 U.S.C. 154(b) by 205 days.

(21) Appl. No.: 18/387,205

(22) Filed: Nov. 6, 2023

(65) Prior Publication Data

US 2025/0151181 A1 May 8, 2025

(51) Int. Cl.
*H05B 45/20* (2020.01)
*H05B 45/325* (2020.01)

(52) U.S. Cl.
CPC ........... *H05B 45/20* (2020.01); *H05B 45/325* (2020.01)

(58) Field of Classification Search
CPC ............... G09G 2320/0626; G09G 2320/0666
See application file for complete search history.

(56) References Cited

U.S. PATENT DOCUMENTS

| | | | |
|---|---|---|---|
| 6,822,991 B2 | 11/2004 | Collins, III et al. | |
| 6,847,057 B1 | 1/2005 | Gardner et al. | |
| 9,246,403 B2 | 1/2016 | Siessegger et al. | |
| 10,104,741 B2 * | 10/2018 | Choi | H05B 47/1965 |
| 10,178,717 B2 | 1/2019 | Seyler et al. | |
| 10,236,409 B2 | 3/2019 | Wildeson et al. | |
| 10,541,352 B2 | 1/2020 | Ishikawa et al. | |
| 10,622,206 B2 | 4/2020 | Wildeson et al. | |
| 10,749,070 B2 | 8/2020 | Wildeson et al. | |
| 10,804,429 B2 | 10/2020 | Wildeson et al. | |
| 10,948,779 B2 * | 3/2021 | Jamali | G02F 1/1395 |
| 11,069,524 B2 | 7/2021 | Wildeson et al. | |
| 11,069,525 B2 | 7/2021 | Wildeson et al. | |

(Continued)

FOREIGN PATENT DOCUMENTS

| | | |
|---|---|---|
| CN | 112969264 | 6/2021 |
| CN | 115399071 | 11/2022 |

(Continued)

OTHER PUBLICATIONS

"U.S. Appl. No. 18/383,698, Examiner Interview Summary mailed Jan. 17, 2025", 2 pages.

(Continued)

*Primary Examiner* — Srinivas Sathiraju
(74) *Attorney, Agent, or Firm* — Schwegman Lundberg & Woesner, P.A.

(57) ABSTRACT

A lighting system and method of driving the array are disclosed. The array includes vertically-stacked polychromic devices having junctions that emit light of different colors. The junctions of each polychromic device along a particular row or column of the array are driven by simultaneously driving multiple separated junctions during one stage of a driving cycle and driving one or more junctions between the separated junctions during another stage of the driving cycle. The polychromic devices are driven by interleaving driving of the rows and columns of the array or by driving all of one of the rows or columns first and then driving all of the other of the rows or columns.

20 Claims, 12 Drawing Sheets

(56) References Cited

U.S. PATENT DOCUMENTS 11,069,836 B2 7/2021 Ishikawa et al.
11,081,622 B2 8/2021 Wildeson et al.
11,404,599 B2 8/2022 Wildeson et al.
11,561,437 B2 * 1/2023 Jamali .................... G02F 1/1395
11,594,572 B2 2/2023 Wildeson et al.
12,494,155 B2 * 12/2025 Herrera ................ G09G 3/2096
2002/0043561 A1 * 4/2002 Tsikos .................... B82Y 15/00 257/E29.144
2003/0019933 A1 * 1/2003 Tsikos ...................... G06K 7/10 235/454
2003/0042303 A1 * 3/2003 Tsikos ................ G06K 7/10594 235/384
2003/0052169 A1 * 3/2003 Tsikos .................... G06V 20/62 235/454
2004/0080938 A1 * 4/2004 Holman .................... F21S 8/08 362/245
2004/0105264 A1 * 6/2004 Spero .................... F21S 41/153 362/276
2005/0074834 A1 * 4/2005 Chaplen ............. G01N 15/1433 702/19
2005/0116667 A1 * 6/2005 Mueller ................ F21V 33/006 315/312
2006/0002110 A1 * 1/2006 Dowling .............. H05B 47/175 362/249.05
2006/0132398 A1 6/2006 Kim et al.
2007/0257623 A1 11/2007 Johnson et al.
2008/0231567 A1 9/2008 Van De Ven et al.
2009/0230883 A1 9/2009 Haug
2011/0062874 A1 * 3/2011 Knapp .................. H04L 12/437 315/158
2011/0069094 A1 * 3/2011 Knapp ................. G09G 3/3426 345/82
2011/0069960 A1 * 3/2011 Knapp .................. H04L 12/437 398/103
2011/0312841 A1 * 12/2011 Silverbrook ............. C12Q 1/68 506/40
2012/0206050 A1 * 8/2012 Spero ........................ F21S 4/28 315/152
2012/0320103 A1 * 12/2012 Jesme .................. H04N 9/3111 345/690
2015/0015147 A1 * 1/2015 Knapp ................. G09G 3/3426 315/158
2015/0061983 A1 * 3/2015 Kim ..................... G09G 3/3275 345/82
2017/0102589 A1 * 4/2017 Yang ................. G02F 1/133621
2018/0090046 A1 * 3/2018 Hong ................... G09G 3/3614
2018/0130405 A1 * 5/2018 Lee .......................... G09G 3/32
2018/0151132 A1 * 5/2018 Lee ....................... G09G 3/2018
2018/0242422 A1 * 8/2018 Choi .................. H05B 47/1965
2018/0366058 A1 * 12/2018 Gu ....................... G09G 3/3677
2019/0141802 A1 * 5/2019 Saes ..................... H05B 45/325
2019/0229149 A1 7/2019 Yoo
2019/0371232 A1 * 12/2019 Kim .......................... G09G 3/32
2020/0005710 A1 * 1/2020 Miyata ................. G09G 3/3233
2020/0152613 A1 5/2020 Deckers
2020/0193905 A1 6/2020 Yoon et al.
2020/0326574 A1 * 10/2020 Jamali ............... G02F 1/133632
2020/0394953 A1 * 12/2020 Kim .......................... G09G 3/32
2021/0110758 A1 4/2021 Rossini et al.
2021/0134215 A1 * 5/2021 Chun ................... G09G 3/3233
2021/0181557 A1 * 6/2021 Jamali ............... G02F 1/133632
2021/0251066 A1 8/2021 Bonne et al.
2022/0028328 A1 * 1/2022 Kim .......................... G09G 3/32
2022/0248513 A1 * 8/2022 Lopez Julia ......... G09G 3/2081
2022/0375397 A1 * 11/2022 Van Lier ................ H05B 45/46
2023/0020077 A1 1/2023 Deckers
2024/0096266 A1 * 3/2024 Lee .......................... G09G 3/32
2024/0429343 A1 12/2024 Wang et al.
2025/0140160 A1 * 5/2025 Herrera ................ G09G 3/2096
2025/0144291 A1 * 5/2025 Dave ................. A61M 5/16804
2025/0151181 A1 * 5/2025 Herrera ................ H05B 45/325
2025/0167181 A1 * 5/2025 Masui ....................... G09G 3/32
2025/0338685 A1 * 10/2025 Masui .................. H10H 20/813

FOREIGN PATENT DOCUMENTS

WO WO-2016169194 A1 * 10/2016 ........... G09G 3/2085
WO WO-2025101409 A1 5/2025

OTHER PUBLICATIONS

"International Application Serial No. PCT US2024 053786, International Search Report mailed Feb. 5, 2025", 3 pages.
"International Application Serial No. PCT US2024 053786, Written Opinion mailed Feb. 5, 2025", 13 pages.
"U.S. Appl. No. 18/383,698, Response filed Feb. 13, 2025 to Non Final Office Action mailed Nov. 13, 2024", 13 pages.
"U.S. Appl. No. 18/383,698, Non Final Office Action mailed Nov. 13, 2024", 9 pages.
"International Application Serial No. PCT US2024 049416, International Search Report mailed Nov. 27, 2024", 4 pages.
"International Application Serial No. PCT US2024 049416, Written Opinion mailed Nov. 27, 2024", 14 pages.
"U.S. Appl. No. 18/383,698, Corrected Notice of Allowability mailed Aug. 25, 2025", 2 pgs.
"U.S. Appl. No. 18/383,698, Examiner Interview Summary mailed Jun. 20, 2025", 2 pgs.
"U.S. Appl. No. 18/383,698, Final Office Action mailed May 19, 2025", 10 pgs.
"U.S. Appl. No. 18/383,698, Notice of Allowance mailed Aug. 7, 2025", 7 pgs.
"U.S. Appl. No. 18/383,698, Response filed Jul. 18, 2025 to Final Office Action mailed May 19, 2025", 14 pgs.

* cited by examiner

SEMI-SIMULTANEOUS DRIVING FOR MULTIJUNCTION POLYCHROMIC DEVICES

BACKGROUND OF THE DISCLOSURE

Light-emitting diodes (LEDs) provide an efficient and relatively smaller source of light compared to conventional light sources. The use of LEDs has evolved from systems that provide purely lighting to more complicated systems that use light in various ways other than merely to provide illumination of an area. Consequently, there is ongoing effort to improve technology that uses LED arrays, as well as find additional uses for LED arrays.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

Figure 1:
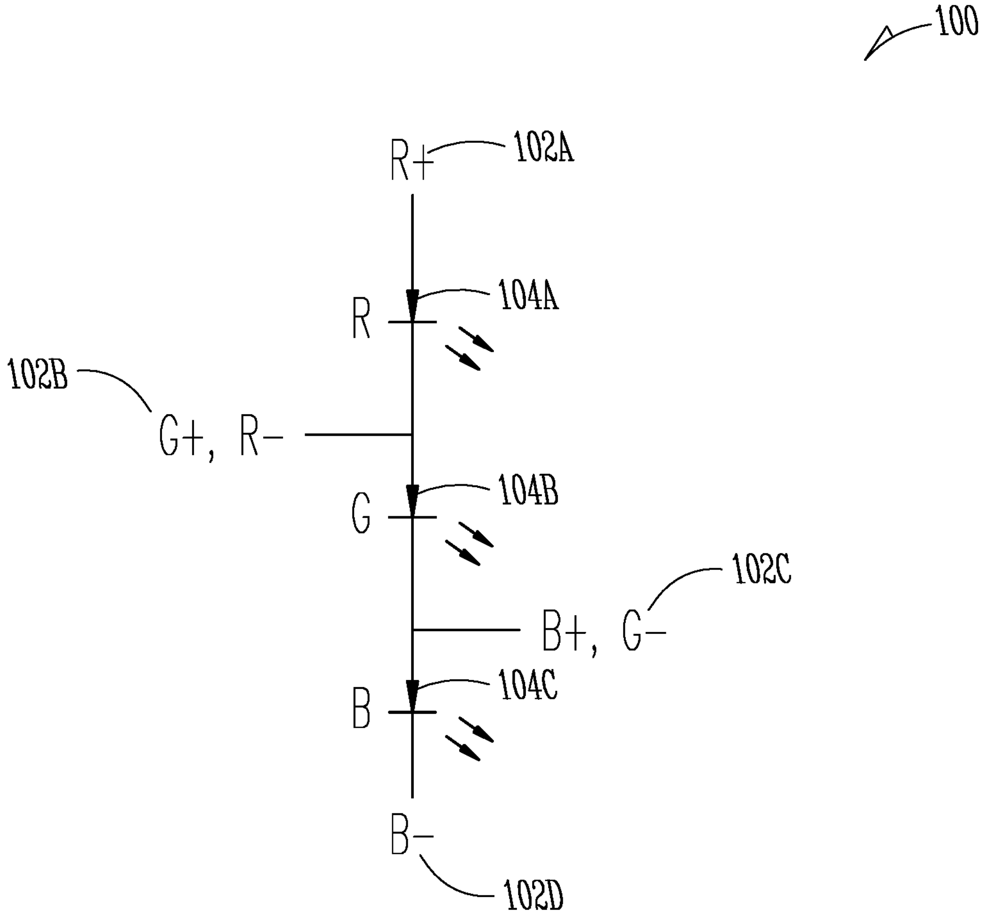
FIG. 1 shows an example of a three-junction polychromic device.

The use of the LEDs in electronic devices has increased rapidly as the number and types of devices have expanded in various ways. Beyond mere displays, for example, compact light sources have recently been incorporated in augmented reality (AR) and virtual reality (VR) devices, among others. Such devices may be enabled by microLED arrays.

A microLED array may contain thousands to millions of microscopic microLEDs that may be individually controlled or controlled in groups of pixels (e.g., 5×5 groups of pixels). MicroLEDs are relatively small (e.g., <0.07 mm on a side) and may provide monochromic or multi-chromic light, typically red, green, blue, or yellow using inorganic semiconductor material. Other LEDs may have a size, for example, of about 4 $mm^2$, 250 micron×250 micron, or larger. Note that while microLEDs are referred to herein, in some aspects, the polychromic matrix may use other size LEDs (e.g., miniLEDs that are larger than the microLEDs or LEDs larger than miniLEDs).

Active layers of microLEDs in general may be formed from one or more inorganic materials (e.g., binary compounds such as gallium arsenide (GaAs), ternary compounds such as aluminum gallium arsenide (AlGaAs), quaternary compounds such as indium gallium phosphide (InGaAsP), gallium nitride (GaN), or other suitable materials), usually either III-V materials (defined by columns of the Periodic Table) or II-VI materials.

The microLEDs in the different arrays may emit light in the visible spectrum (about 400 nm to about 800 nm) and/or may emit light in the infrared spectrum (above about 800 nm). MicroLEDs may be formed by epitaxially growing active, n- and p-type semiconductors on a rigid substrate (which may be textured). The substrate may include, for example, sapphire aluminum oxide ($Al_2O_3$) or silicon carbide (SIC), among others. In particular, various layers are deposited and processed on the substrate during fabrication of the microLEDs to form a microLED array. The surface of the substrate may be pretreated to anneal, etch, polish, etc. the surface prior to deposition of the various layers. The original substrate may be removed and replaced by a thin transparent rigid substrate, such as glass, or a flexible substrate, for example plastic. In general, the various active layers may be fabricated using epitaxial semiconductor deposition to deposit one or more semiconductor layers, metal deposition (e.g., by sputtering), oxide growth, as well as etching, liftoff, and cleaning, among other operations.

In some aspects, the growth substrate may be removed from the microLED structure after fabrication and after connection to contacts on a backplane via metal bonding such as wire or ball bonding. The backplane may be a printed circuit board or wafer containing integrated circuits (ICs), such as a complementary metal oxide semiconductor (CMOS) IC wafer. The semiconductor deposition operations may be used to create a microLED with an active region in which electron-hole recombination occurs and the light from the microLED is generated. The active region may be, for example, one or more quantum wells. Metal contacts may be used to drive provide current to the n- and p-type semiconductors from the ICs of the backplane on which the microLED array is disposed. Methods of depositing materials, layers, and thin films may include, for example: sputter deposition, atomic layer deposition (ALD), chemical vapor deposition (CVD), physical vapor deposition (PVD), plasma enhanced atomic layer deposition (PEALD), plasma enhanced chemical vapor deposition (PECVD), and combinations thereof, among others.

In some aspects, one or more other layers, such as a phosphor-converting layer that contains phosphor particles, may be disposed on some or all of the microLEDs or microLED arrays to convert at least a portion of the light from the microLEDs to light of a different wavelength. For example, blue light may be converted into near infrared light or white light by the phosphor-converting layer.

Recently, multi-junction polychromic microLED devices have been developed using InGaN as the active semiconductor. A polychromic InGaN device is a vertically-stacked multi-color (typically RGB) device in which three pn-junctions (for three colors) are connected via tunnel junctions. The term vertical as used herein indicates a direction of growth or deposition on a substrate (an array of such devices thus has devices arranged in horizontal [or lateral] directions). Specifics of fabrication of the polychromic microLED devices may be found at U.S. Pat. Nos. 10,236, 409B2, 10,749,070B2, 10,541,352B2, 10,804,429B2, 10,622,206B2, 11,069,836B2, 11,069,524B2, 11,069,525B2, 11,404,599B2, 11,081,622B2, 11,594,572B2, 6,822,991B2, 6,847,057B1, which are herein incorporated in their entirety.

Although a three-junction device is described herein, as it may be the most fundamental as a color-display engine, the number of junctions is not limited in this regard. Other devices may be fabricated using a two-junction or a four-(or more) junction device as the junctions are vertically stacked. This enables separate access to each junction by fabricating appropriate contacts via lithography and etching and deposition techniques.

FIG. 1 shows an example of a three-junction polychromic device. The three-junction polychromic device 100 has four electrical contact terminals 102*a*, 102*b*, 102*c*, 102*d*, which enable independent control of three current values. Each current value may be used to control a different junction (microLED) 104*a*, 104*b*, 104*c* of the three-junction polychromic device 100. In some aspects, each junction 104*a*, 104*b*, 104*c* of the polychromic device 100 may be a different color, for example, red-green-blue (RGB) as shown in FIG. 1. In other aspects, at least one of the colors of the polychromic device 100 (whether three or more junctions are fabricated) may be the same, which may permit more precise control of the relative intensity of the colors.

Figure 2:
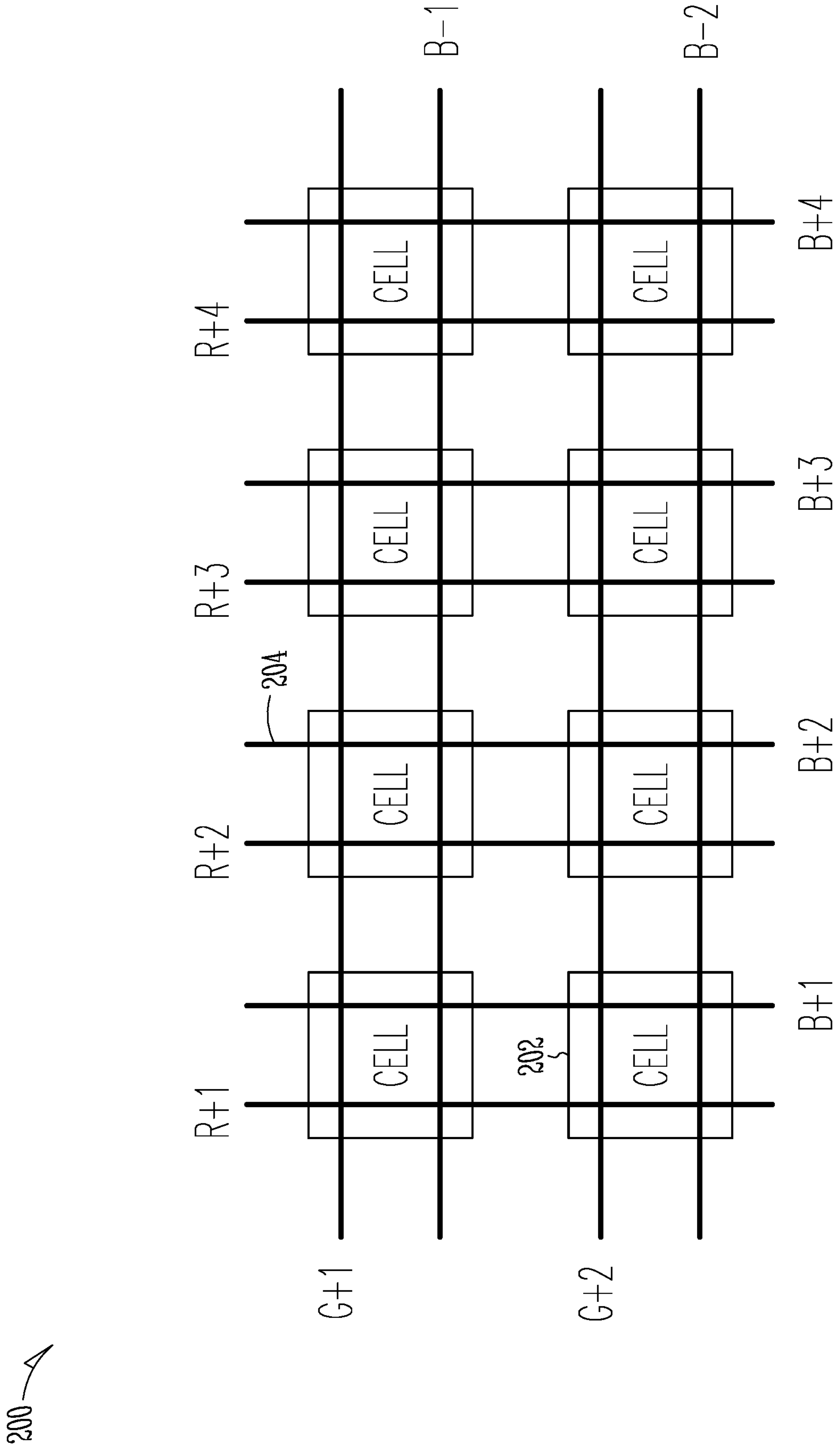
FIG. 2 show an example of a polychromic matrix.

FIG. 2 shows an example of a polychromic matrix. The polychromic matrix 200 may contain a large number (e.g., thousands to millions or more) of the three-junction polychromic devices shown in FIG. 1 formed in an array of cells 202 (also referred to as pixels). The cells 202 may be addressed using individually-addressible bus lines 204, which may extend across the entirety of the polychromic matrix 200. Each cell 202 accordingly includes four terminals that are coupled to the addressible bus lines 204. The polychromic matrix 200 in FIG. 2 may have a rectangular shape in some aspects. As above, in other aspects, the number of addressible bus lines 204 may be different for matrices of polychromic devices that have a different number of junctions from that shown in FIG. 1.

To contruct a display device, a polychromic device wafer may be prepared via photolithographic techniques. As the cell 202 has four terminals, and to operate the junctions individually, the horizontal bus lines 204 shown in FIG. 2 are G+/R− and B− and the vertical bus lines 204 are R+ and B+/G−. In various aspects, while the colors provided by the horizontal and vertical bus lines 204 are interchangeable, the pairing of R+ and B+/G− and the pairing of R−/G+ and B− are fixed because of the vertically-stacked circuitry shown in FIG. 1. In other aspects, in which the order of the colors shown in FIG. 1 is different, the bus lines 204 may be changed accordingly.

Figure 3:
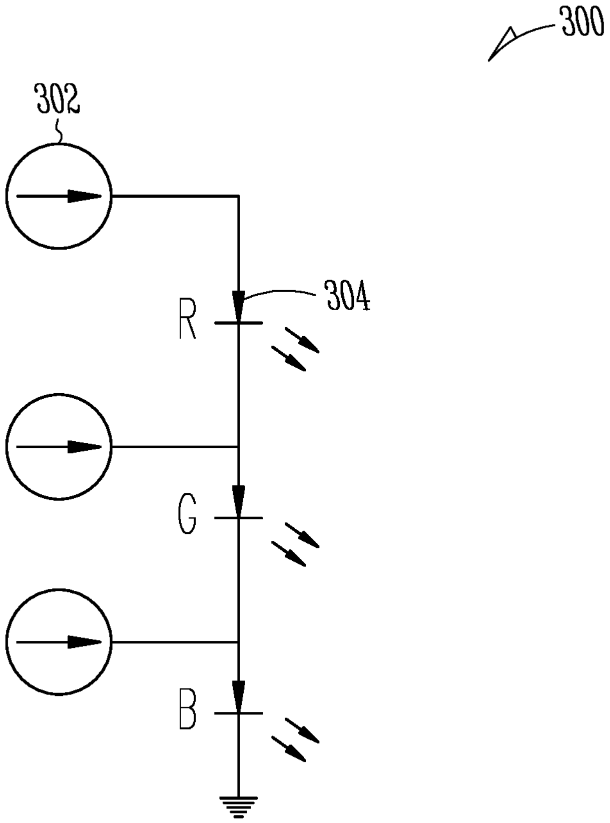
FIG. 3 shows an example of fully simultaneous RGB driving of the three-junction polychromic device shown in FIG. 1.

FIG. 3 shows an example of fully simultaneous RGB driving of the three-junction polychromic device shown in FIG. 1. During each period of a driving cycle, current 302 enters the first junction (at the R+ terminal) of the polychromic device 300 and exits the last junction (at the B− terminal), which is grounded. All of the junctions 304 in a particular cell shown in FIG. 2 may as shown be driven simultaneously by providing current along the G+ bus line and grounding the B-bus line associated with the cell. The length of the driving cycle may be set as desired. As shown each junction 304 may emit R, G, B color light respectively, in other aspects the number of junctions and/or colors emitted by each junction may be different from that shown.

Simultaneous driving of the three-junction polychromic device may be a technique to achieve a mixed color, such as white light. The resulting color may be tuned by adjusting ratios of the currents passing through each of the three junctions. To adjust the ratios, current may flow into and out of the different intermediate contact terminals. However, independent control of the different currents flowing through the different junctions at any given moment is a source of significant complications to circuit design, and, in some cases may lead to the desired color not being able to be achieved. Alternatively, the junctions may sequentially be driven such that each junction is driven during a different phase of the driving cycle; i.e., up to only one junction of the vertically stacked polychromic junctions is driven by a forward current at any instance in time. At some time instances, no junctions may be driven—i.e., the polychromic device is turned off. As above, the three-junction RGB polychromic device is merely an example of vertically-stacked junction LED devices, whose number of individual microLEDs and thus colors may be different from that described herein.

Figure 4:
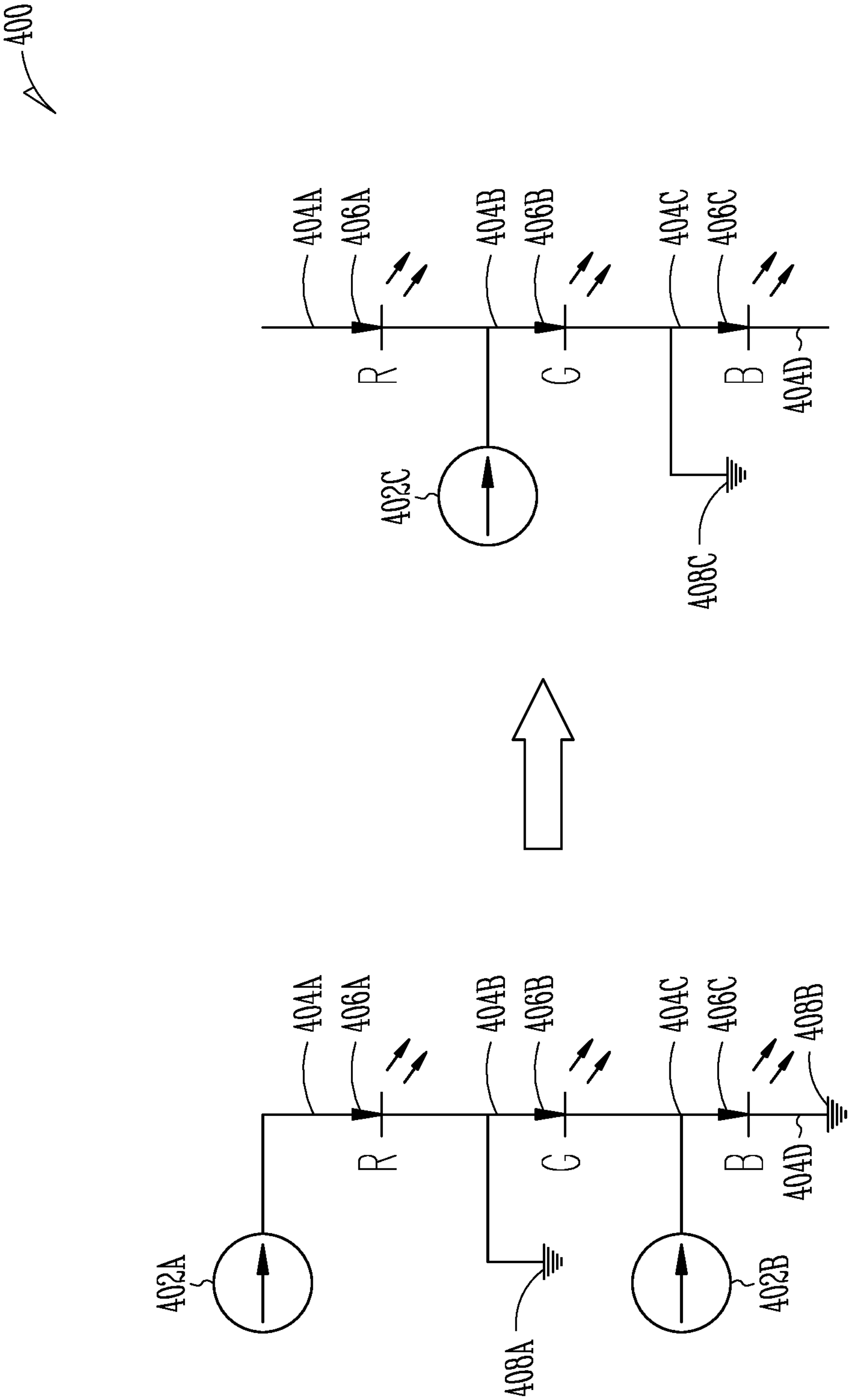
FIG. 4 shows an example of two-stage pixel addressing of the three-junction polychromic device using a semi-simultaneous approach shown in FIG. 1.

Another driving scheme that mitigates at least some of the issues of simultaneous driving and image display while improving issues related to the purely sequential driving scheme may combine the simultaneous and sequential driving to provide a driving scheme that is partially simultaneous and partially sequential. Such a driving scheme may improve speed and resolution constraints when compared to a fully sequential driving scheme, while consuming more logic, power, and area resources. Specifically, a two-stage addressing strategy, referred here as semi-simultaneous driving, may be used to drive the three-junction polychromic device. FIG. 4 shows an example of two-stage pixel addressing of the three-junction polychromic device using the semi-simultaneous approach.

Because of persistence of human vision, color mixing may be achieved by switching primary colors at a rate that is relatively fast (e.g., faster than the video frame rate of 24 or 30 frames per second) in the time domain. A frame is a single image provided by a display; a series of frames form a video. One benefit to the driving circuitry used in the semi-simultaneous driving, while achieving satisfactory color mixing to the human eye, is that the complexity of wiring for the array of cells and drivers is dramatically reduced by sharing common traces across junctions in the same column or row of the array. Additionally, the total panel load remains reduced since activation of at least some of the junctions occurs at different times. Color tuning can be done by adjusting each current for one cycle (analog dimming), but also it can be achieved by adjusting each on-time duration per cycle (digital dimming).

The semi-simultaneous driving may incorporate simultaneous driving of at least one junction of a multi-junction polychromic device during a first stage of the driving cycle followed sequentially by driving of at least one other junction of the polychromic device during a second stage of the driving cycle, with more than one junction being driven during at least one of the first stage or second stage. In the aspect shown in FIG. 4, during the first stage current 402*a*, 402*b* may be supplied respectively to terminals 404*a* (R+) and 404*c* (B+/G−) of the polychromic device 400 and terminals 404*b* (R−/G+) and 404*d* (B−) may be coupled to ground 408*a*, 408*b*. This simultaneously drives junctions 406*a*, 406*c*, shown in FIG. 4 as the R and B microLEDs, while junction 406*b* (G) is not driven (i.e., is inactive/off).

As shown in FIG. 4, current is supplied to the anode of the junctions 406*a*, 406*b*, 406*c* being driven and the cathodes of the junctions 406*a*, 406*b*, 406*c* being driven are grounded.

Figure 5:
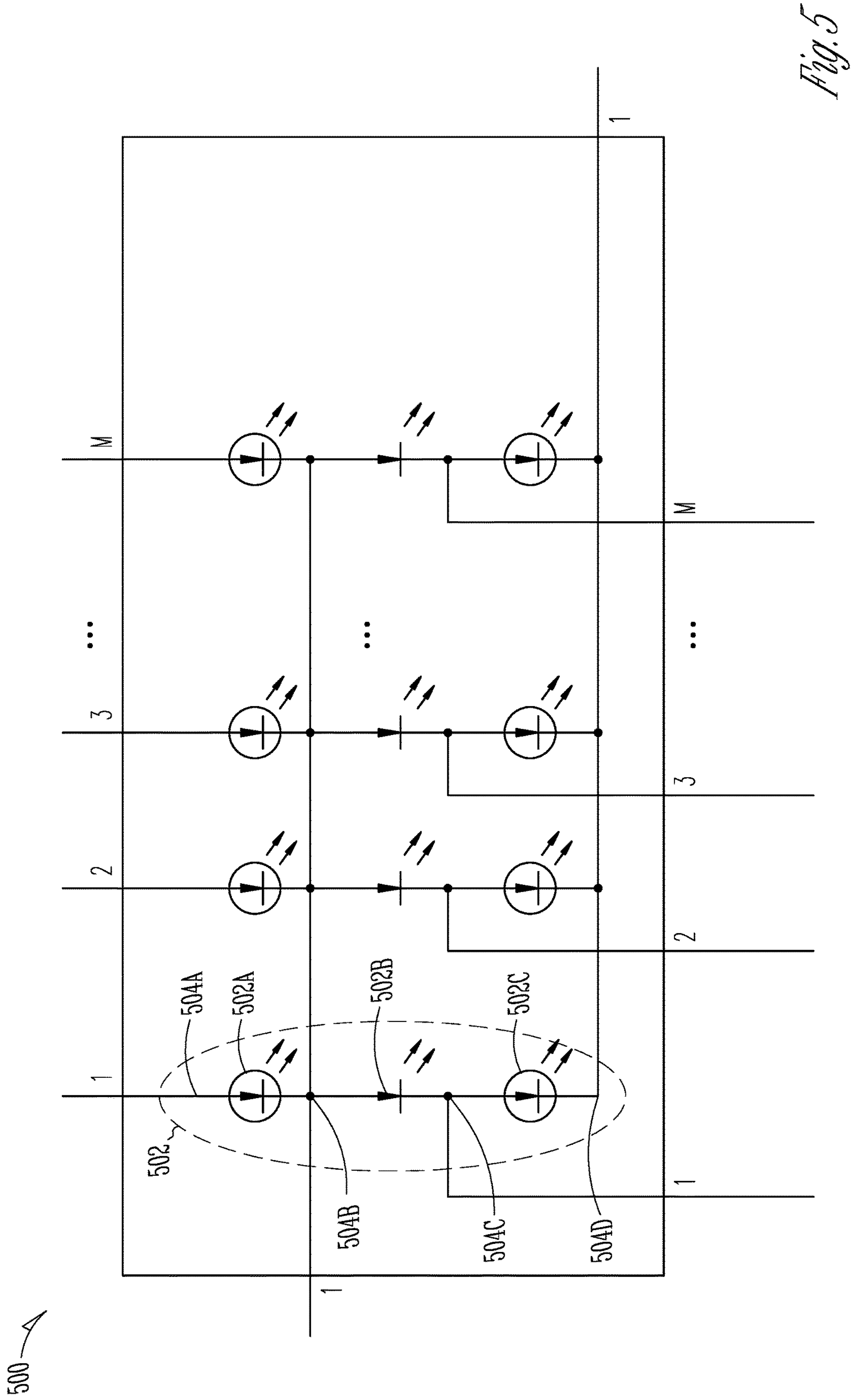
FIG. 5 shows an example of a first driving stage of a polychromic matrix using the semi-simultaneous approach.

FIG. 5 shows an example of a first driving stage of a polychromic matrix using a semi-simultaneous approach. The matrix 500 may have multiple polychromic devices 502, each having a red junction 502*a* (LED) configured to emit red light, a green junction 502*b* configured to emit green light, and a blue junction 502*c* configured to emit blue light. Each polychromic device 502 has multiple terminals 504*a*, 504*b*, 504*c*, 504*d*. Each terminal 504*b*, 504*d* of each polychromic device 502 along a row of the matrix 500 is coupled with a respective terminal 504*b*, 504*d* of each other polychromic device 502 in the same row. As shown in FIG. 5, during the first stage, an entire row of red junctions 502*a* and blue junctions 502*c* of M polychromic devices 502 are coupled to LED drivers (not shown) via the corresponding R+ terminal 504*a* and B+ (G−) terminal 504*c*, while the G+ (R−) terminal 504*b* and B− terminal 504*d* are coupled to ground. The use of independent drivers for the red junctions 502*a* and blue junctions 502*c* and ground access allows the simultaneous activation red junctions 502*a* and blue junctions 502*c* of the polychromic devices 502 in an entire row of the matrix 500.

Conversely, in the aspect shown in FIG. 4, during the second stage current 402*c* may be supplied to terminal 404*b* (R−/G+) and terminal 404*c* (B+/G−) may be coupled to ground 408*c*. This drives junction 406*b*, shown in FIG. 4 as G microLEDs, while junctions 406*a*, 406*c* (G) are not driven (i.e., is inactive/off). Thus, junctions 406*a*, 406*c* are driven simultaneously and junction 406*b* is driven sequentially with junctions 406*a*, 406*c*.

Figure 6:
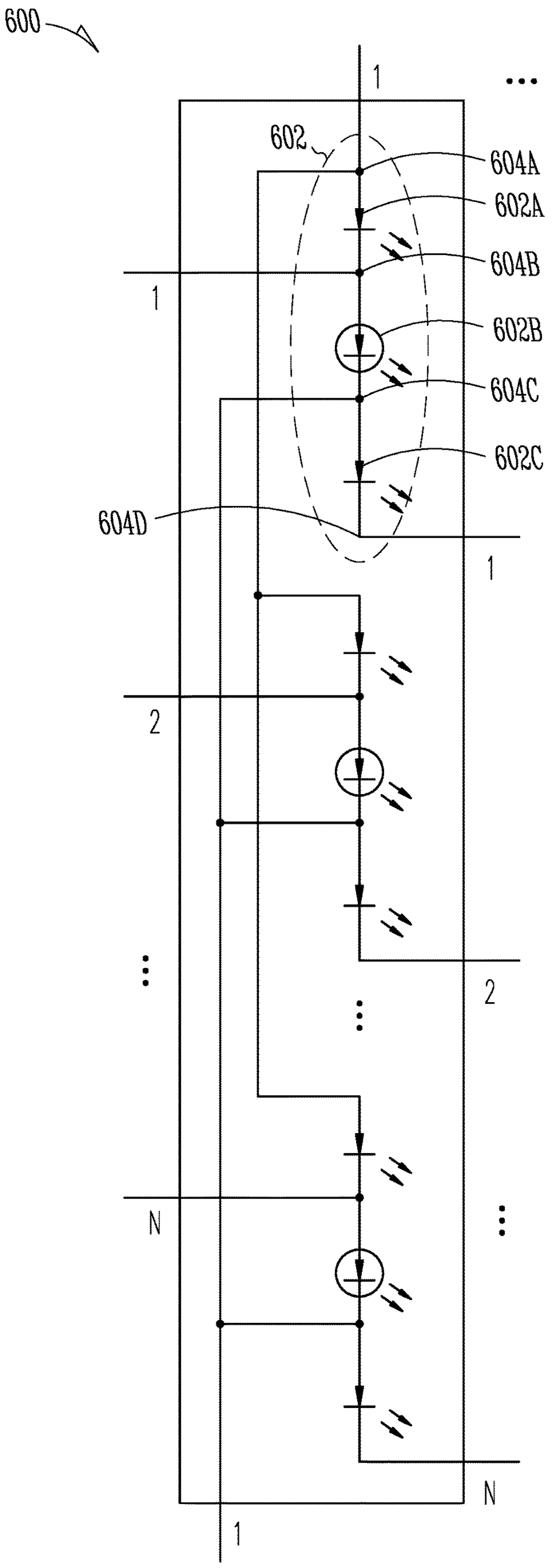
FIG. 6 shows an example of a second driving stage of a polychromic matrix using the semi-simultaneous approach.

FIG. 6 shows an example of a second driving stage of a polychromic matrix using the semi-simultaneous approach. The matrix 600 may have multiple polychromic devices 602, each having a red junction 602*a* (LED) configured to emit red light, a green junction 602*b* configured to emit green light, and a blue junction 602*c* configured to emit blue light. Each polychromic device 602 has multiple terminals 604*a*, 604*b*, 604*c*, 604*d*. Each terminal 604*a*, 604*c* of each polychromic devices 602 along a column of the matrix 600 is coupled with a respective terminal 604*a*, 604*c* of each other polychromic device 602 in the same column. As shown in FIG. 6, during the second stage, an entire row of green junctions 602*b* of M polychromic devices 602 are coupled to an LED driver (not shown) via the corresponding G+ (R−) terminal 604*b*, while the B+ (G−) terminal 604*c* is coupled to ground. The use of a driver that is independent of the other (red junction 502*a* and blue junction 502*c*) drivers and ground access allows the simultaneous activation green junctions 602*b* of the polychromic devices 602 in an entire row of the matrix 600 since every G+ (R−) terminal 604*b* receives source current independently.

Figure 7:
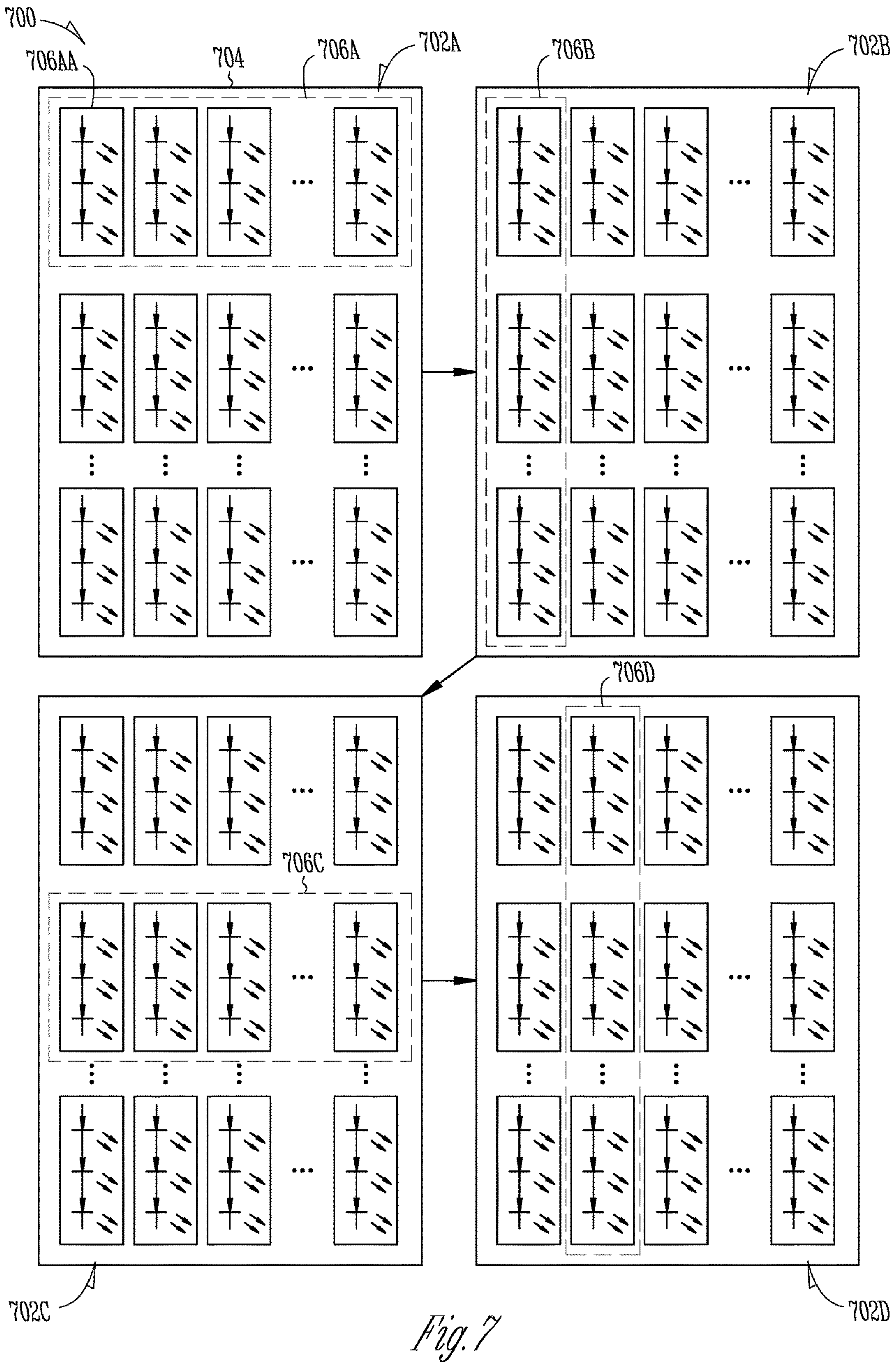
FIG. 7 shows an example of interleaved pixel traversal in a polychromic matrix using the semi-simultaneous approach.

FIG. 7 shows an example of interleaved pixel traversal in a polychromic matrix using the semi-simultaneous approach. The semi-simultaneous approach 700 shown in FIG. 7 illustrates different sets 706*a*, 706*b*, 706*c*, 706*d* of polychromic devices 706*aa* driven in a polychromic matrix 704, dependent on the particular stage 702*a*, 702*b*, 702*c*, 702*d* of the driving cycle.

The semi-simultaneous approach 700 may then follow one of three sequences in driving the polychromic matrix 704: a) driving interleaved rows and columns of polychromic devices 706*aa* of the polychromic matrix 704, b) driving rows first and then columns of polychromic devices 706*aa* of the polychromic matrix 704, c) driving columns first and then rows of polychromic devices 706*aa* of the polychromic matrix 704. The interleaved approach is shown in FIG. 7, where the activation of row-wise polychromic devices 706*aa* is followed by activation of column-wise polychromic devices 706*aa*. That is, each of the junctions of a particular row of polychromic devices 706*aa* is activated prior to activation of each of the junctions of a particular column of polychromic devices 706*aa*.

As shown, in the first stage 702*a*, the first set 706*a* of polychromic devices 706*aa* is limited to the first row of polychromic devices 706*aa*. In some aspects, such as the polychromic devices 706*aa* described herein, the red microLEDs and blue microLEDs of the polychromic devices 706*aa* in the first row are driven simultaneously.

In the second stage 702*b*, the second set 706*b* of polychromic devices 706*aa* is limited to the first column of polychromic devices 706*aa*. The first set 706*a* of polychromic devices 706*aa* and the second set 706*b* of polychromic devices 706*aa* have a single polychromic device 706*aa* in common. As above, in the second stage 702*b*, the green microLEDs of the polychromic devices 706*aa* in the first column are driven simultaneously.

In the third stage 702*c*, the third set 706*c* of polychromic devices 706*aa* is limited to the second row of polychromic devices 706*aa*. Thus, the red microLEDs and blue microLEDs of the polychromic devices 706*aa* in the second row are driven simultaneously. The third set 706*c* of polychromic devices 706*aa* and the second set 706*b* of polychromic devices 706*aa* have a single polychromic device 706*aa* in common, but the third set 706*c* of polychromic devices 706*aa* and the first set 706*a* of polychromic devices 706*aa* have no polychromic devices 706*aa* in common as the first set 706*a* of polychromic devices 706*aa* and the third set 706*c* of polychromic devices 706*aa* form different rows of the polychromic matrix 704.

In the fourth stage 702*d*, the fourth set 706*d* of polychromic devices 706*aa* is limited to the second column of polychromic devices 706*aa*. As above, in the second stage 702*b*, the green microLEDs of the polychromic devices 706*aa* in the second column are driven simultaneously. The fourth set 706*d* of polychromic devices 706*aa* and the third set 706*c* of polychromic devices 706*aa* have a single polychromic device 706*aa* in common, but the fourth set 706*d* of polychromic devices 706*aa* and the second set 706*b* of polychromic devices 706*aa* have no polychromic devices 706*aa* in common as the second set 706*b* of polychromic devices 706*aa* and the fourth set 706*d* of polychromic devices 706*aa* form different columns of the polychromic polychromic matrix 704.

Driving the sets 706*a*, 706*b*, 706*c*, 706*d* of polychromic devices 706*aa* may continue until each microLED in the entire polychromic matrix 704 is driven. While the rows and columns driven in successive alternate stages (e.g., 1 and 3, or 2 and 4) of the interleaved driving scheme shown in FIG. 7 are shown as being adjacent (e.g., the row of polychromic devices 706*aa* of the first stage 702*a* is adjacent to the row of polychromic devices 706*aa* of the third stage 702*c*) in other aspects, the rows and columns in successive stages may be non-adjacent.

The semi-simultaneous approach 700 is able to complete a full panel scan (a scan of the entire polychromic matrix 704) in M+N stages, while a completely sequential approach (i.e., individual driving of each microLED in the polychromic matrix) takes 3·M·N stages for a three-junction polychromic device. The reduction in stages of the semi-simultaneous approach 700 in comparison to the sequential approach allows a decrease in the frequency of a pulse width modulation (PWM) clock to obtain the same rate of frames per second for the entire panel. Alternatively, or in addition, the semi-simultaneous approach 700 may be able increase the resolution of the panel, allowing a richer color gamut to be obtained when displaying images on the panel.

In other aspects, a combination of interleaving and contiguous driving may be used. For example, a set of rows (e.g., two) may be driven and then a set of columns may be driven before the next set of rows is driven. The number of rows/columns in a set may differ and may vary during the driving cycle (e.g., two rows, then one column, then one row, then three columns). Although a frame may be produced by driving rows/columns in order, moving from one row/column to the adjacent row/column (rastering) in adjacent stages, other driving schemes in which non-adjacent rows/columns are driven in adjacent stages may be used in other aspects. In addition, the junctions may be driven in different orders between stages (e.g., red and blue driven first and green driven next in one stage, green driven first and then red and blue in another stage).

Figure 8:
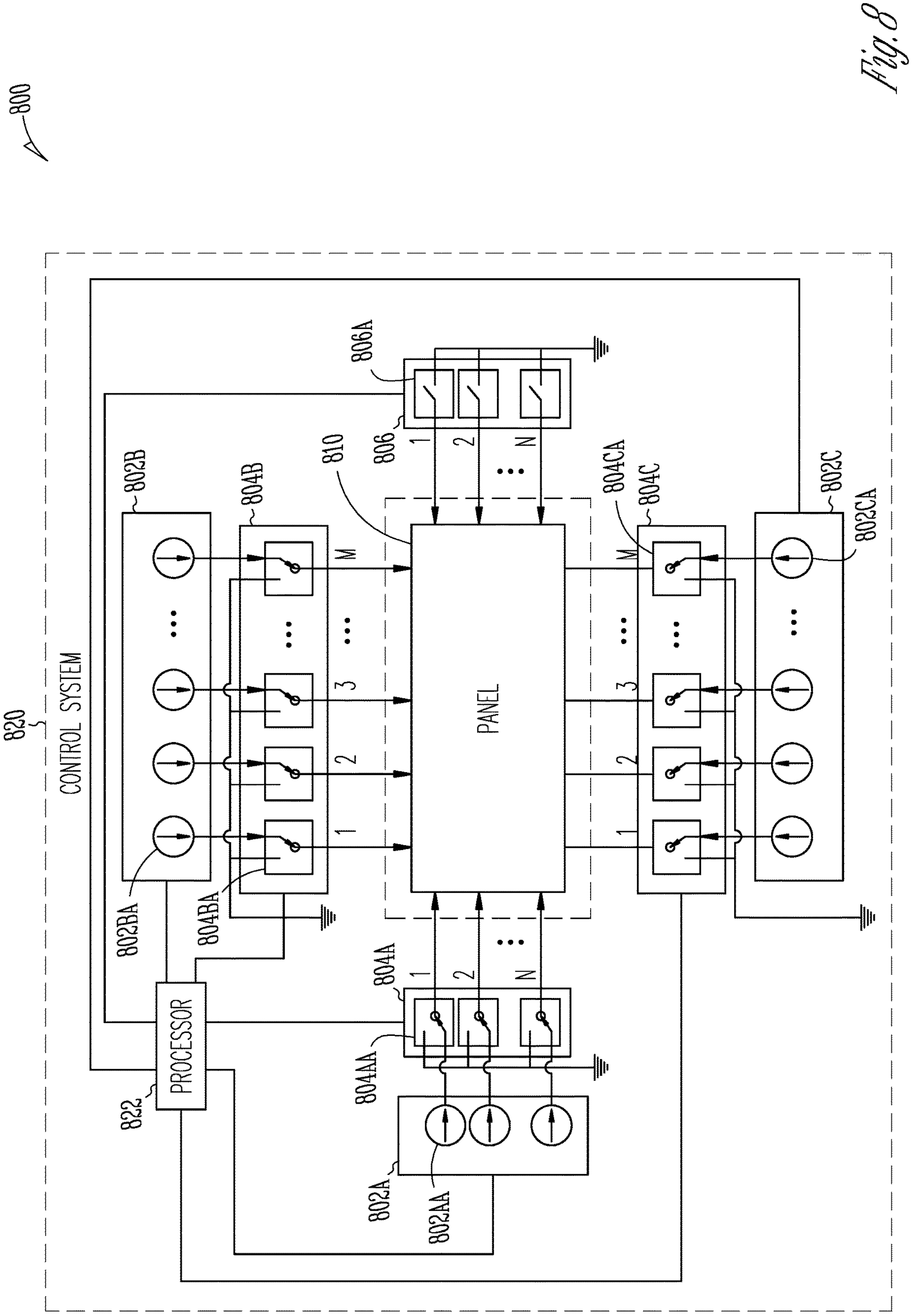
FIG. 8 shows an example of a block diagram of a system for semi-simultaneous driving of a polychromic matrix.

FIG. 8 shows an example of a block diagram of a system for semi-simultaneous driving of a polychromic matrix. The system 800 includes a panel 810 (e.g., M×N matrix) of polychromic devices that each contain junctions that emit light of multiple colors. As herein, the number of polychromic devices, the number of junctions, and the colors emitted by the junctions may be designed. For example, some of the junctions in each polychromic device may emit light of the same color (e.g., due to the relative efficiencies of light emission between the different colors). As shown in FIG. 2, each row and column within the panel 810 of FIG. 8 is associated with a pair of bus lines that extend through the entire panel 810.

The panel 810 is coupled to a variety of circuitry that is configured to control light emission from polychromic devices in the panel 810. A control system 820 receives the frames to display on the panel 810 dependent on the panel size. A processor 822 of the control system 820 is configured to produce digital signals to control current generation circuits 802*a*, 802*b*, 802*c*, duty cycle switching circuits 804*a*, 804*b*, 804*c*, and a ground switching circuit 806. Other circuitry to support image display by the panel 810 may be present, but is not shown for convenience. In some aspects, each of the current generation circuits 802*a*, 802*b*, 802*c*, duty cycle switching circuits 804*a*, 804*b*, 804*c*, and/or ground switching circuit 806 may be provided as a single circuit element (or integrated circuit) or multiple substantially identical circuit elements may be used to provide the particular functionality (e.g., two current generation circuit elements may form the current generation circuit 802*a*).

Each current generation circuit 802*a*, 802*b*, 802*c* may include individual current generators 802*aa*, 802*ba*, 802*ca*. Each current generation circuit 802*a*, 802*b*, 802*c* is configured to supply the rows or columns of the panel 810, with each current generator 802*aa*, 802*ba*, 802*ca* supplying a different bus line and thus a unique (different) junction of the polychromic devices disposed along the corresponding row or column. Accordingly, the number of current generators 802*aa*, 802*ba*, 802*ca* in each current generation circuit 802*a*, 802*b*, 802*c* may depend on the number of rows and columns (as well as bus lines) in the panel 810 as well as whether the current is being supplied to a row or to a column of the panel 810.

The current generators 802*aa*, 802*ba*, 802*ca* may be configured to set a desired bias current per color. The bias currents may be set by the processor 822 a single time during testing of the system 800 or may be able to be changed based on later testing of the panel 810 if issues later arise in the panel 810 and/or circuitry of the control system 820. For example, depending of the technology used, the bias currents may dynamically change over time when analog dimming is used by the control system 820. The control system 820 may accordingly be built with multi-channel current drivers (i.e., current drivers with multiple channels) that provide different amounts of current or with a single current driver (such as in the sequential driving approach) along with current mirrors to independently supply current to each connected bus line in the panel 810. Multi-channel current drivers may be used as each current generation circuit 802*a*, 802*b*, 802*c* to provide the current.

Similarly, the duty cycle switching circuits 804*a*, 804*b*, 804*c* may contain individual switches 804*aa*, 804*ba*, 804*ca*. Each switch 804*aa*, 804*ba*, 804*ca* is associated with a different current generator 802*aa*, 802*ba*, 802*ca*. Each duty cycle switching circuit 804*a*, 804*b*, 804*c* is configured to provide the current from the associated current generator 802*aa*, 802*ba*, 802*ca* to the rows or columns of the panel 810 or to ground the rows or columns of the panel 810. Different duty cycle switching circuits 804*a*, 804*c* that supply current to the rows of the panel 810 as shown in FIG. 8 supply different bus lines of the rows of the panel 810. Each switch 804*aa*, 804*ba*, 804*ca* controls the current to (and grounding of) a different bus line in the corresponding row or column (and thus junction within the polychromic devices along the row or column). Accordingly, the number of switches 804*aa*, 804*ba*, 804*ca* in each duty cycle switching circuit 804*a*, 804*b*, 804*c* may depend on the number of rows and columns (and bus lines) in the panel 810 as well as whether the current is being supplied to a row or to a column of the panel 810.

As each bus line has a different current generator 802*aa*, 802*ba*, 802*ca* associated with the bus line, a dedicated switch 804*aa*, 804*ba*, 804*ca* handles a desired duty cycle and grounds the bus line when the connected junctions are to act as a sink. The switches 804*aa*, 804*ba*, 804*ca* may be an array of analog switches that allow current flow in both directions to achieve this function. The duty cycle switching circuits 804*a*, 804*b*, 804*c* may be continuously configured to set the digital brightness levels according to the frames being processed and displayed by the panel 810.

The ground switching circuit 806 similarly contains multiple individual switches 806*a* that are each activated to ground one of the columns and thus the B-junctions associated with the column. The switches 806*a* of the ground switching circuit 806 ground different bus lines than the columns supplied by the current generators 802*ca* of the current generation circuit 802*c* via the switches 804*ca* of the duty cycle switching circuit 804*c*.

In some aspects, the currents supplied by the current generator 802*ba*, 802*aa*, 802*ca* may be used to respectively drive the R+ terminal, the R−/G+ terminal, and the B+/G− terminal of the pixels in the panel 810. The ground switching circuit 806 may ground the B− terminal of the pixels in the panel 810. Unlike the duty cycle switching circuit 804*a*, 804*b*, 804*c*, the ground switching circuit 806 is not coupled to a current source driver line; consequently, while a duty cycle signal may be supplied to each switch 804*aa*, 804*ba*, 804*ca* in the duty cycle switching circuits 804*a*, 804*b*, 804*c*, no duty cycle signal is supplied to the switches 806*a* in the ground switching circuit 806.

The processor 822 may be programmed to handle settings for each current generation circuit 802*a*, 802*b*, 802*c* and to apply the PWM duty cycle to each analog switch 804*aa*, 804*ba*, 804*ca*, 806*a* across the M·N panel 810 according to the specified frame rate and bits per pixel. Since addressing the analog switches 804*aa*, 804*ba*, 804*ca*, 806*a* may be overwhelming in terms of pin count, a serializer/deserializer (SerDes) may be used to reduce the output signals of the control system 820. The serializer function in the SerDes may be used to transform parallel data to a serial stream of data, while the deserializer function in the SerDes may be used to transform the serial stream of data to the original parallel data. Thus, rather than using a single pin for each switch 804*aa*, 804*ba*, 804*ca*, 806*a*, the SerDes may be used to allow each pin to address one or multiple switches 804*aa*, 804*ba*, 804*ca*, 806*a*.

Figure 9:
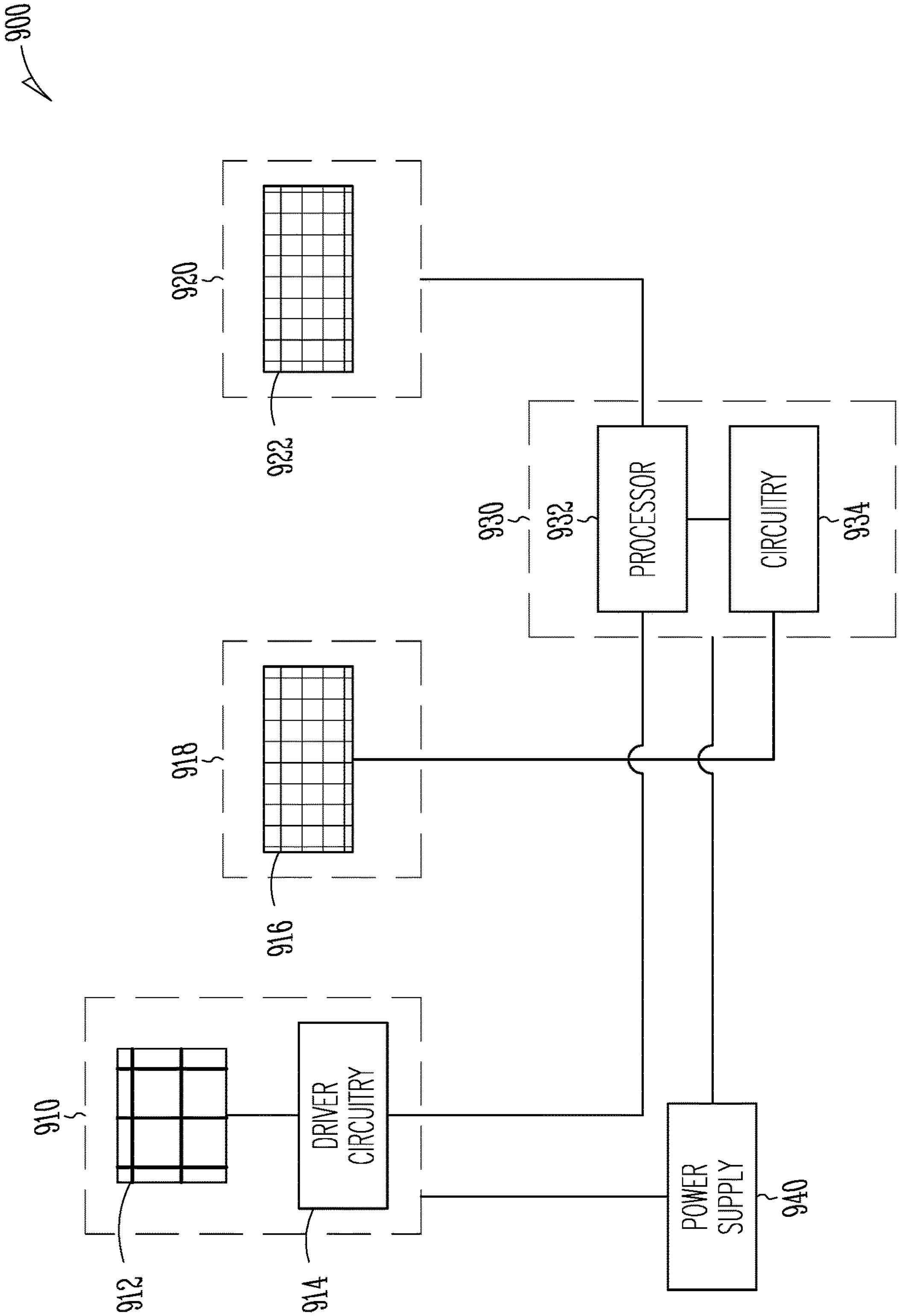
FIG. 9 shows an example lighting system that contains the polychromic matrix.

FIG. 9 shows an example lighting system that contains the polychromic matrix. The system 900 may include one or more light sources 910. The light source 910 may include one or more microLED arrays 912, including a, as described herein. The light source 910 may include driving circuitry 914, as also described herein. A light detector 918 may contain a photodiode array 916 that detects the light from the microLED devices in the light source 910. The photodiode array 916 may be disposed within an apparatus containing the light source 910 or may be separate from the light source 910.

A controller 930 may include a processor 932 (or equivalently, processing circuitry), which may be used to control various functions of the system 900. As also shown, the controller 930 may contain further components, such as a circuitry 934 configured to drive, among others, the photodiode array 916 as controlled by the processor 932. In some embodiments, the circuitry 934 may also be configured to provide non-local driving of the microLED array 912 of the light source 910 and may include other circuits, e.g., the non-FPGA circuitry shown in FIG. 4 (including the driver circuitry if not present in the light source 910).

The light source 910 may include at least one lens and/or other optical elements such as reflectors. In different embodiments, a single lens may be disposed over the microLED array 912 or multiple lenses may be disposed over the microLED array 912. The lens and/or other optical elements may direct the light emitted by the microLED array 912 toward a target.

The processor 932 may also control one or more sensors 920 that includes a multi-pixel detector 922. The sensor 920 may sense light at the wavelength or wavelengths emitted by the microLED array 912 and reflected by a target, radiation that is emitted by the target, and or other wavelengths. The sensor 920 may, for example, be a radar or lidar sensor, or the processor 932 may be used to determine the presence of specific objects (e.g., other vehicles, people, road signs) nearby. The sensor 920 may include optical elements (e.g., at least one sensor lens) to capture the radiation. The multi-pixel detector 922 may include, for example, photodiodes or one or more other detectors capable of detecting light in the wavelength range(s) of interest. The multi-pixel detector 922 may include multiple different arrays to sense visible and/or infrared light. The multi-pixel detector 922 may have one or more segments (that are able to sense the same wavelength/range of wavelengths or different wavelength/range of wavelengths), similar to the photodiode array 916.

In some embodiments, instead of, or in addition to, being provided in the sensor 920, a multi-pixel detector may be provided in the light detector 918. In some embodiments, the light detector 918 and the sensor 920 may be integrated in a single module, while in other embodiments, the light detector 918 and the sensor 920 may be separate modules that are disposed on a printed circuit board (PCB) or other mount. In other embodiments, the light detector 918 and the sensor 920 may be attached to different PCBs or mounts. Similarly, the light source 910 may be integrated in a single module with the light detector 918 or may be separate from the light detector 918.

The microLEDs in the microLED array 912 may be driven as described herein. The components of the system 900 shown in FIG. 9 may be provided power using a power supply 940, such as a battery.

Figure 10:
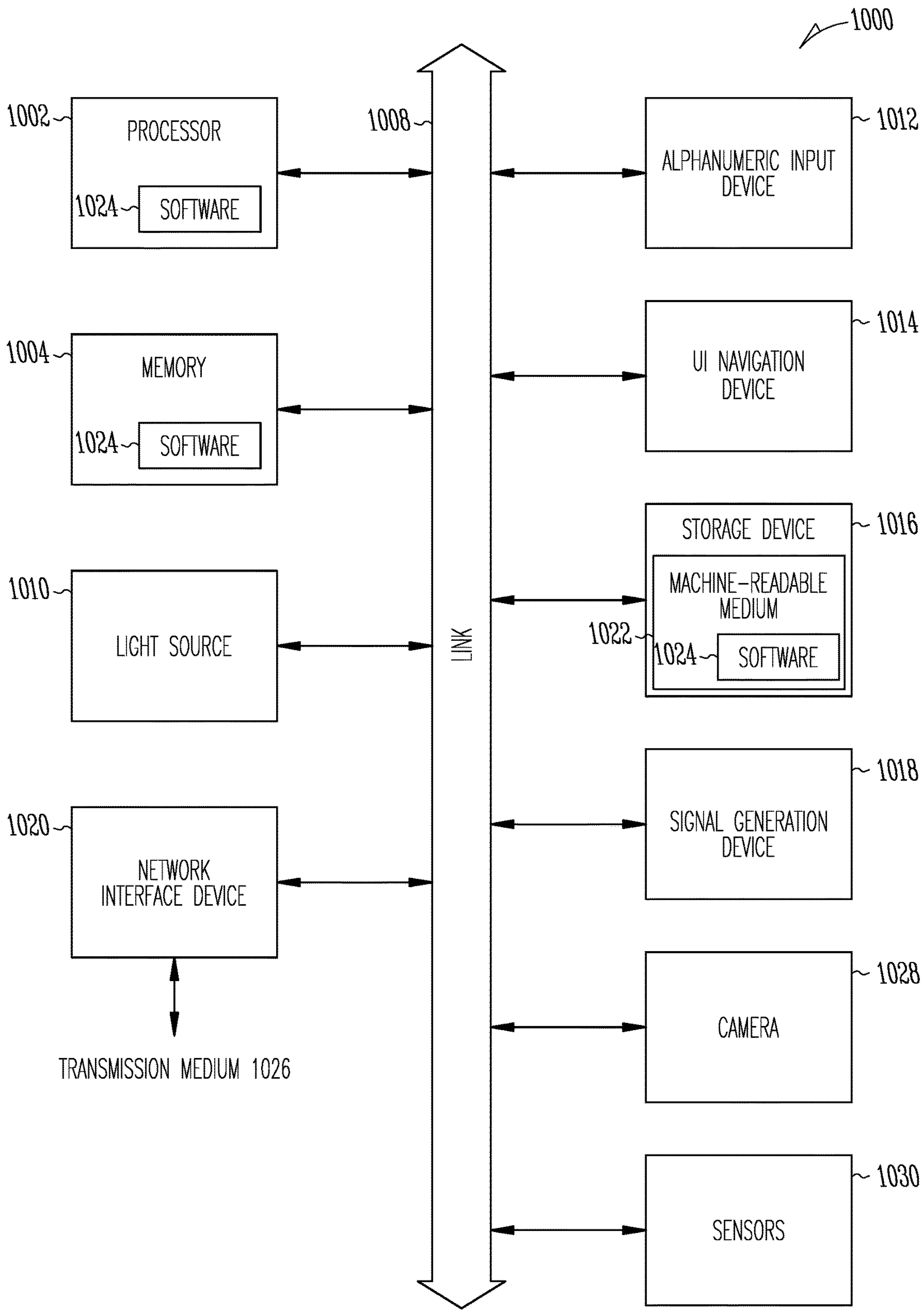
FIG. 10 shows an example of an electronic device in accordance with some embodiments.

FIG. 10 illustrates an example of an electronic device in accordance with some embodiments. The electronic device 1000 may be, for example, a display, a monitor or screen, a wearable/mobile display device such as an AR/VR headset, a vehicular headlight, lighting for a particular area, or any other lighting arrangement. Various elements may be provided on a backplane indicated above, while other elements may be local or remote. Examples, as described herein, may include, or may operate on, logic or a number of components, modules, or mechanisms.

Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The electronic device 1000 may include a hardware processor (or equivalently processing circuitry) 1002 (e.g., a central processing unit (CPU), a GPU, a hardware processor core, or any combination thereof), a memory 1004 (which may include main and static memory), some or all of which may communicate with each other via an interlink (e.g., bus) 1008. The memory 1004 may contain any or all of removable storage and non-removable storage, volatile memory or non-volatile memory. The electronic device 1000 may further include a light source 1010 such as the microLEDs described above, or a video display, an alphanumeric input device 1012 (e.g., a keyboard), and a user interface (UI) navigation device 1014 (e.g., a mouse). In an example, the light source 1010, input device 1012 and UI navigation device 1014 may be a touch screen display. The electronic device 1000 may additionally include a storage device (e.g., drive unit) 1016, a signal generation device 1018 (e.g., a speaker), a network interface device 1020, one or more cameras 1028, and one or more sensors 1030, such as a global positioning system (GPS) sensor, compass, accelerometer, or other sensor such as those described herein. The electronic device 1000 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). Some of the elements, such as one or more of the sparse arrays that provide the light source 1010 may be remote from other elements and may be controlled by the hardware processor 1002.

The storage device 1016 may include a non-transitory machine readable medium 1022 (hereinafter simply referred to as machine readable medium) on which is stored one or more sets of data structures or instructions 1024 (e.g., software) embodying or utilized by any one or more of the techniques or functions described herein. A storage device 1016 that includes the non-transitory machine readable medium should not be construed as that either the device or the machine-readable medium is itself incapable of having physical movement. The instructions 1024 may also reside, completely or at least partially, within the memory 1004 and/or within the hardware processor 1002 during execution thereof by the electronic device 1000. While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the electronic device 1000 and that cause the electronic device 1000 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 1024 may further be transmitted or received over a communications network using a transmission medium 1026 via the network interface device 1020 utilizing any one of a number of wireless local area network (WLAN) transfer protocols or a SPI or CAN bus. Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 1002.11 family of standards known as Wi-Fi, IEEE 1002.14 family of standards known as WiMax, IEEE 1002.14.4 family of standards, a Long Term Evolution (LTE) family of standards, a Universal Mobile Telecommunications System (UMTS) family of standards, peer-to-peer (P2P) networks, a next generation (NG)/6$^{th}$ generation (6G) standards among others. In an example, the network interface device 1020 may include one or more physical jacks (e.g., Ethernet, coaxial, or phone jacks) or one or more antennas to connect to the transmission medium 1026.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical CPU, a single- or multi-core processor, and/or any other device capable of executing or otherwise operating computer-executable instructions, such as program code, software modules, and/or functional processes.

The camera 1028 may sense light at least the wavelength or wavelengths emitted by the microLEDs. The camera 1028 may include optical elements (e.g., at least one camera lens) that are able to collect reflected light of illumination that is reflected from and/or emitted by an illuminated region. The camera lens may direct the reflected light onto a multi-pixel sensor (also referred to as a light sensor) to form an image of on the multi-pixel sensor.

The processor 1002 may control and drive the LEDs via one or more drivers. For example, the processor 1002 may optionally control one or more microLEDs in microLED arrays independent of another one or more microLEDs in the microLED arrays, so as to illuminate an area in a specified manner.

In addition, the sensors 1030 may be incorporated in the camera 1028 and/or the light source 1010. The sensors 1030 may sense visible and/or infrared light and may further sense the ambient light and/or variations/flicker in the ambient light in addition to reception of the reflected light from the LEDs. The sensors may have one or more segments (that are able to sense the same wavelength/range of wavelengths or different wavelength/range of wavelengths), similar to the LED arrays.

Figure 11:
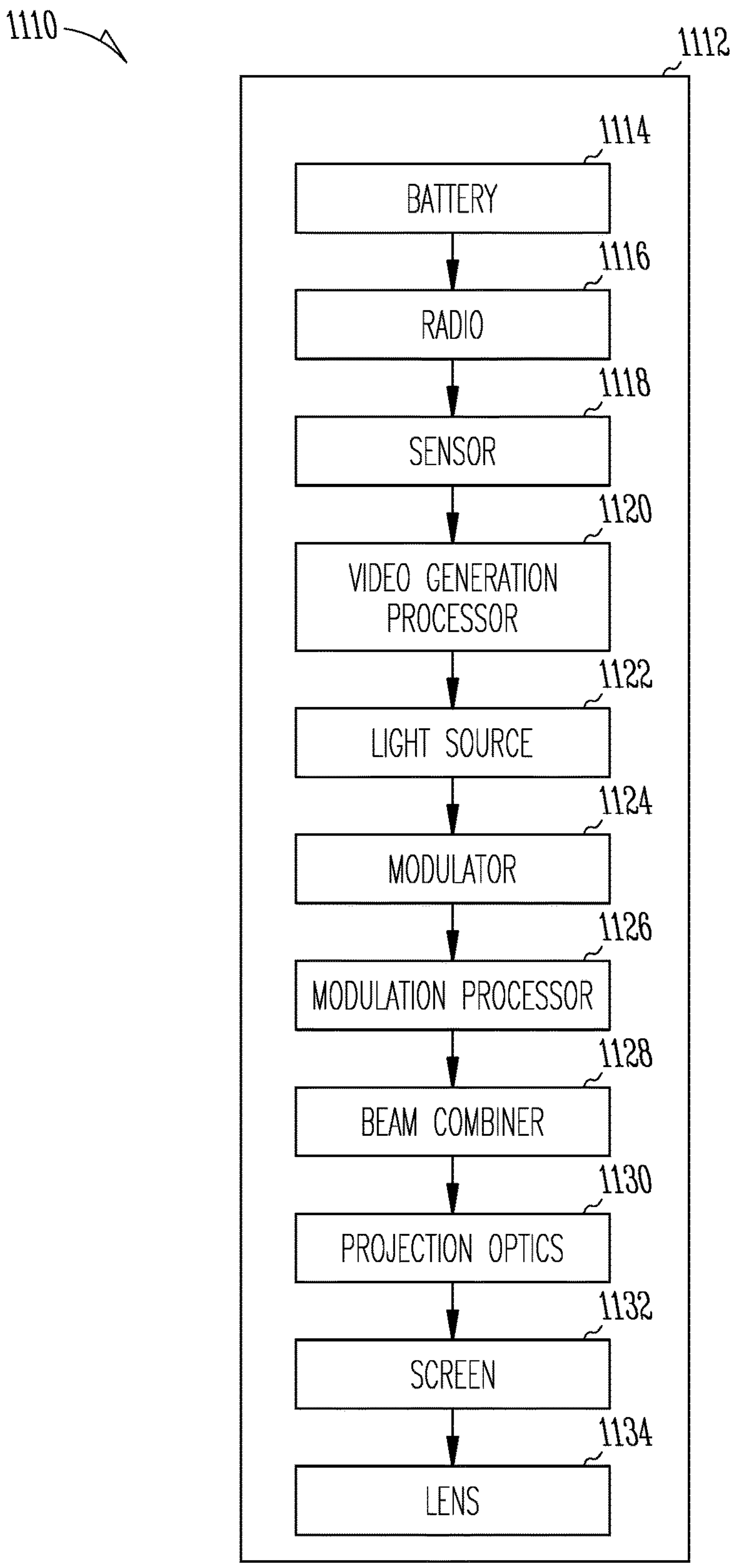
FIG. 11 shows a block diagram of an example of a visualization system that contains the polychromic matrix described herein.

FIG. 11 shows a block diagram of an example of a visualization system that contains the polychromic matrix described herein. The visualization system 1110 can include a wearable housing 1112, such as a headset or goggles. The housing 1112 can mechanically support and house the elements detailed below. In some examples, one or more of the elements detailed below can be included in one or more additional housings that can be separate from the wearable housing 1112 and couplable to the wearable housing 1112 wirelessly and/or via a wired connection. For example, a separate housing can reduce the weight of wearable goggles, such as by including batteries, radios, and other elements. The housing 1112 can include one or more batteries 1114, which can electrically power any or all of the elements detailed below. The housing 1112 can include circuitry that can electrically couple to an external power supply, such as a wall outlet, to recharge the batteries 1114. The housing 1112 can include one or more radios 1116 to communicate wirelessly with a server or network via a suitable protocol, such as WiFi.

The visualization system 1110 can include one or more sensors 1118, such as optical sensors, audio sensors, tactile sensors, thermal sensors, gyroscopic sensors, time-of-flight sensors, triangulation-based sensors, and others. In some examples, one or more of the sensors can sense a location, a position, and/or an orientation of a user. In some examples, one or more of the sensors 1118 can produce a sensor signal in response to the sensed location, position, and/or orientation. The sensor signal can include sensor data that corresponds to a sensed location, position, and/or orientation. For example, the sensor data can include a depth map of the surroundings. In some examples, such as for an augmented reality system, one or more of the sensors 1118 can capture a real-time video image of the surroundings proximate a user.

The visualization system 1110 can include one or more video generation processors 1120. The one or more video generation processors 1120 may receive scene data from a server and/or a storage medium. The scene data may represent a three-dimensional scene, such as a set of position coordinates for objects in the scene or a depth map of the scene. The one or more video generation processors 1120 can receive one or more sensor signals from the one or more sensors 1118. In response to the scene data, which represents the surroundings, and at least one sensor signal, which represents the location and/or orientation of the user with respect to the surroundings, the one or more video generation processors 1120 can generate at least one video signal that corresponds to a view of the scene. In some examples, the one or more video generation processors 1120 can generate two video signals, one for each eye of the user, that represent a view of the scene from a point of view of the left eye and the right eye of the user, respectively. In some examples, the one or more video generation processors 1120 can generate more than two video signals and combine the video signals to provide one video signal for both eyes, two video signals for the two eyes, or other combinations.

The visualization system 1110 can include one or more light sources 1122 such as those described herein that can provide light for a display of the visualization system 1110. Suitable light sources 1122 can include microLEDs as indicated above in addition to or instead of monolithic LEDs, one or more microLED arrays disposed on a common substrate, segmented microLEDs disposed on a single substrate whose microLEDs are individually addressable and controllable (and/or controllable in groups and/or subsets), and others. In some examples, one or more of the light sources 1122 can include microLEDs disposed on a transparent flexible substrate, and a rigid substrate adhered to the transparent flexible substrate with an adhesive layer such that the microLEDs are located between the rigid substrate and the transparent flexible substrate.

The one or more light sources 1122 can include light-producing elements having different colors or wavelengths. For example, a light source can include red microLEDs that can emit red light, green microLEDs that can emit green light, and blue microLEDs that can emit blue right. The red, green, and blue light combine in specified ratios to produce any suitable color that is visually perceptible in a visible portion of the electromagnetic spectrum.

The visualization system 1110 can include one or more modulators 1124. The modulators 1124 can be implemented in one of at least two configurations.

In a first configuration, the modulators 1124 can include circuitry that can modulate the light sources 1122 directly. For example, the light sources 1122 can include an array of light-emitting diodes, and the modulators 1124 can directly modulate the electrical power, electrical voltage, and/or electrical current directed to each light-emitting diode in the array to form modulated light. The modulation can be performed in an analog manner and/or a digital manner. In some examples, the light sources 1122 can include an array of red microLEDs, an array of green microLEDs, and an array of blue microLEDs, and the modulators 1124 can directly modulate the red microLEDs, the green microLEDs, and the blue microLEDs to form the modulated light to produce a specified image.

In a second configuration, the modulators 1124 can include a modulation panel, such as a liquid crystal panel. The light sources 1122 can produce uniform illumination, or nearly uniform illumination, to illuminate the modulation panel. The modulation panel can include pixels. Each pixel can selectively attenuate a respective portion of the modulation panel area in response to an electrical modulation signal to form the modulated light. In some examples, the modulators 1124 can include multiple modulation panels that can modulate different colors of light. For example, the modulators 1124 can include a red modulation panel that can attenuate red light from a red light source such as a red microLED, a green modulation panel that can attenuate green light from a green light source such as a green microLED, and a blue modulation panel that can attenuate blue light from a blue light source such as a blue microLED.

In some examples of the second configuration, the modulators 1124 can receive uniform white light or nearly uniform white light from a white light source, such as a white-light microLED. The modulation panel can include wavelength-selective filters on each pixel of the modulation panel. The panel pixels can be arranged in groups (such as groups of three or four), where each group can form a pixel of a color image. For example, each group can include a panel pixel with a red color filter, a panel pixel with a green color filter, and a panel pixel with a blue color filter. Other suitable configurations can also be used.

The visualization system 1110 can include one or more modulation processors 1126, which can receive a video signal, such as from the one or more video generation processors 1120, and, in response, can produce an electrical modulation signal. For configurations in which the modulators 1124 directly modulate the light sources 1122, the electrical modulation signal can drive the light sources 1122. For configurations in which the modulators 1124 include a modulation panel, the electrical modulation signal can drive the modulation panel.

The visualization system 1110 can include one or more beam combiners 1128 (also referred to as beam splitters), which can combine light beams of different colors to form a single multi-color beam. For configurations in which the light sources 1122 can include multiple microLEDs of different colors, the visualization system 1110 can include one or more wavelength-sensitive (e.g., dichroic) beam combiners 1128 that can combine the light of different colors to form a single multi-color beam.

The visualization system 1110 can direct the modulated light toward the eyes of the viewer in one of at least two configurations. In a first configuration, the visualization system 1110 can function as a projector, and can include suitable projection optics 1130 that can project the modulated light onto one or more screens 1132. The screens 1132 can be located a suitable distance from an eye of the user. The visualization system 1110 can optionally include one or more lenses 1134 that can locate a virtual image of a screen 1132 at a suitable distance from the eye, such as a close-focus distance, such as 500 mm, 950 mm, or another suitable distance. In some examples, the visualization system 1110 can include a single screen 1132, such that the modulated light can be directed toward both eyes of the user. In some examples, the visualization system 1110 can include two screens 1132, such that the modulated light from each screen 1132 can be directed toward a respective eye of the user. In some examples, the visualization system 1110 can include more than two screens 1132. In a second configuration, the visualization system 1110 can direct the modulated light directly into one or both eyes of a viewer. For example, the projection optics 1130 can form an image on a retina of an eye of the user, or an image on each retina of the two eyes of the user.

For some configurations of AR systems, the visualization system 1110 can include an at least partially transparent display, such that a user can view the user's surroundings through the display. For such configurations, the augmented reality system can produce modulated light that corresponds to the augmentation of the surroundings, rather than the surroundings itself. For example, in the example of a retailer showing a chair, the augmented reality system can direct modulated light, corresponding to the chair but not the rest of the room, toward a screen or toward an eye of a user.

Figure 12:
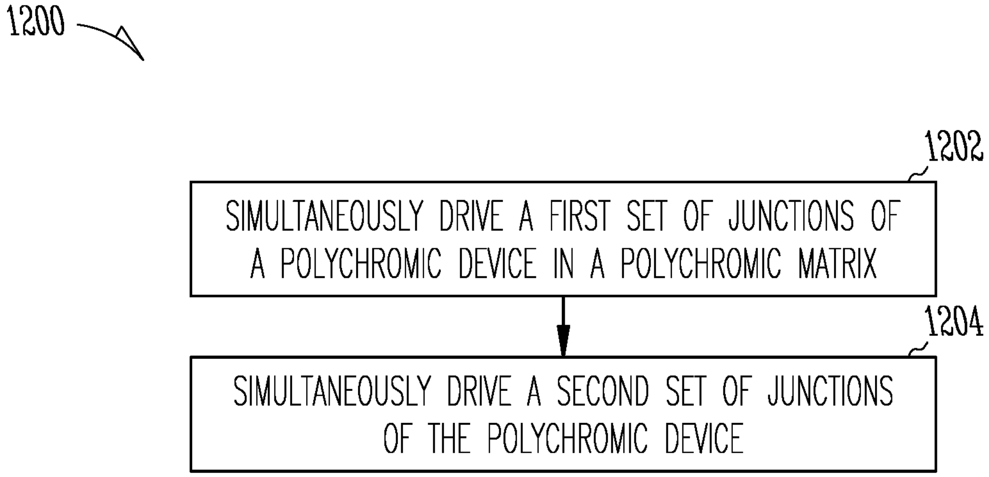
FIG. 12 show an example method of driving a polychromic matrix.

FIG. 12 show an example method of driving a polychromic matrix. In some aspects, the process 1200 of FIG. 12 may be performed by a device or a portion thereof. At operation 1202, the process may include driving a first set of junctions (microLEDs) in a vertically-stacked polychromic device within a polychromic matrix simultaneously during a first stage of a driving cycle. Each polychromic device contains multiple, e.g., three or more, vertically-stacked junctions that are able to be individually driven by supplying a current to one side of a particular junction and grounding the other side of the junction. When driven, the junctions may emit light of different colors, for example. Multiple polychromic devices within a row and/or column of the polychromic matrix may be driven simultaneously during the first stage. The driving of each polychromic device may be adjusted using PWM. At operation 1204, the process may further include simultaneously driving, during a second stage of the driving cycle, a second set of junctions in the vertically-stacked polychromic device. The second stage is sequential with respect to the first stage such that the second set of junctions are driven sequentially with the first set of junctions. At least one of the first set of junctions or the second set of junctions includes multiple junctions, while the other set of junctions includes one or more junctions. The multiple junctions that are driven simultaneously are vertically separated within the polychromic device by at least one other junction. The polychromic matrix may be driven such that rows of the polychromic matrix are interleaved with columns of the polychromic matrix, rows are driven first and columns driven thereafter, or columns are driven first and rows driven thereafter. Note that other operations may be present.

EXAMPLES

In some embodiments, other components may be present, while in other embodiments not all of the components may be present. As indicated herein, although the term "a" is used herein, one or more of the associated elements may be used in different embodiments. For example, the term "a processor" configured to carry out specific operations includes both a single processor configured to carry out all of the operations as well as multiple processors individually configured to carry out some or all of the operations (which may overlap) such that the combination of processors carry out all of the operations; thus, the term "processor" is synonymous with "processing circuitry". Further, the term "includes" may be considered to be interpreted as "includes at least" the elements that follow.

While only certain features of the system and method have been illustrated and described herein, many modifications and changes will occur to those skilled in the art. It is, therefore, to be understood that the appended claims are intended to cover all such modifications and changes.

What is claimed is:

1. A light system comprising:

an array of pixels arranged in rows and columns, each of the pixels in the array containing a polychromic device that has vertically-stacked junctions at least some of which are configured to emit light of different colors;

a plurality of current generators, each current generator of the plurality of current generators configured to supply a current to a different junction of one of each of the polychromic devices disposed along a particular row or column of the array; and a processor configured to control, for each of the polychromic devices, the current supplied to a plurality of the junctions of the polychromic device during a first stage of a driving cycle to display a frame using the array and at least one other of the junctions of the polychromic device during a second stage of the driving cycle.

2. The light system of claim 1, wherein the processor is configured to control the supply of the current to drive the plurality of the junctions prior to the at least one other of the junctions during the driving cycle.

3. The light system of claim 1, wherein the plurality of the junctions to which the current is simultaneously supplied are vertically separated within the polychromic device by the at least one other of the junctions.

4. The light system of claim 1, wherein the processor is configured to control the supply of the current to anodes of the plurality of the junctions and to ground cathodes of the plurality of the junctions and anodes of the at least one other of the junctions during the first stage of the driving cycle.

5. The light system of claim 1, further comprising a plurality of switches, each current generator of the plurality of current generators coupled to the different junction of the one of each of the polychromic devices disposed along the particular row or column of the array through a different switch of the plurality of switches, the processor further configured to control each switch of the plurality of switches to select between the current from a respective current generator of the plurality of current generators and ground to supply to the different junction of each of the polychromic devices along the particular row or column of the array.

6. The light system of claim 5, further comprising an other plurality of switches coupled to an other of the junctions of each of the polychromic devices along the particular row or column of the array, the other plurality of switches coupled to ground without being coupled to any of the current generators, the processor further configured to control each switch of the plurality of switches to select whether to ground the other one of the junctions.

7. The light system of claim 5, wherein the processor is further configured to control a duty cycle of the current supplied by each switch of the plurality of switches using pulse width modulation (PWM).

8. The light system of claim 1, wherein the processor is further configured to set a bias current to be supplied by each current generator of the plurality of current generators dependent on a color of the junctions driven by the current generator.

9. The light system of claim 1, wherein each current generator of the plurality of current generators comprises a current driver with multiple channels configured to provide different amounts of current, the processor further configured to select one of the multiple channels in response to a determination that the current to be supplied to the different junction of each of the polychromic devices along the particular row or column of the array is to be adjusted.

10. The light system of claim 1, wherein each current generator comprises a single current driver with current mirrors configured to provide different amounts of current, the processor further configured to select one of the amounts of current in response to a determination that the current to be supplied to the different junction of each of the polychromic devices along the particular row or column of the array is to be adjusted.

11. The light system of claim 1, wherein the processor is configured to control the supply of the current to drive the polychromic devices of the array by interleaving driving of the polychromic devices in rows of the array with the polychromic devices in columns of the array.

12. The light system of claim 1, wherein the processor is configured to control the supply of the current to drive the polychromic devices of the array by driving of the polychromic devices in one of all rows of the array and in one of all columns of the array and subsequently driving of the polychromic devices in another of all rows of the array and another of all columns of the array.

13. The light system of claim 1, wherein each of the polychromic devices includes:

a first terminal coupled to a first end of a first junction, the first junction configured to emit first color light, a second terminal coupled to a first end of a second junction, the first end of the second junction coupled to a second end of the first junction, the second junction configured to emit second color light different from the first color light, a third terminal coupled to a first end of a third junction, the first end of the third junction coupled to a second end of the second junction, the third junction configured to emit third color light different from the first color light and the second color light, and a fourth terminal coupled to a second end of the third junction to selectably ground the third junction.

14. The light system of claim 1, wherein each of the polychromic devices includes a red micro light-emitting device (LED), a green microLED, and a blue microLED.

15. A control system comprising:

a first set of switches and a second set of switches;

a plurality of current generators, each current generator of the plurality of current generators configured to supply a current through a respective switch of the first set of switches to a different vertically-stacked junction of each polychromic device of an array of polychromic devices along a particular row or column of the array of polychromic devices; and a processor configured to control, for each polychromic device of the polychromic devices along the particular row or column of the array:

the current supplied to a plurality of the junctions of the polychromic device simultaneously during a first stage of a driving cycle to display a frame using the array and at least one other of the junctions of the polychromic device during a second stage of the driving cycle;

the first set of switches to select between the current from a respective current generator of the plurality of current generators and ground to supply to the different junction of the polychromic device; and the second set of switches to select whether to ground another of the junctions of the polychromic device, the second set of switches coupled to ground without being coupled to any of the current generators.

16. The control system of claim 15, wherein the processor is further configured to control the supply of the current to drive the polychromic devices of the array by interleaving driving of the polychromic devices in rows of the array with the polychromic devices in columns of the array.

17. The control system of claim 15, wherein the processor is further configured to control the supply of the current to drive the polychromic devices of the array by driving of the polychromic devices in one of all rows of the array and in all columns of the array and subsequently driving of the polychromic devices in another of all rows of the array and in all columns of the array.

18. A method of providing light from an array of polychromic devices, the method comprising displaying a frame using the array of polychromic devices, each polychromic device of the array of polychromic devices having vertically-stacked junctions, by controlling supply of a current to a different junction of each polychromic device of the array of polychromic devices along a particular row or column of the array by supplying the current to a plurality of the junctions of the polychromic device simultaneously during a first stage of a driving cycle and at least one other of the junctions of the polychromic device during a second stage of the driving cycle, the supply of the current controlled by selecting between the current from a respective current generator of the plurality of current generators and ground to supply to the particular junction of each polychromic device of the array of polychromic devices along the particular row or column of the array and selecting between grounding and disconnecting another of the junctions of each polychromic device of the array of polychromic devices along the particular row or column of the array.

19. The method of claim 18, further comprising controlling the supply of the current to drive the polychromic devices of the array by interleaving driving of the polychromic devices in rows of the array with the polychromic devices in columns of the array.

20. The method of claim 18, further comprising controlling the supply of the current to drive the polychromic devices of the array by driving of the polychromic devices in one of all rows of the array and in all columns of the array and subsequently driving of the polychromic devices in another of all rows of the array and in all columns of the array.

* * * * *